Dec. 10, 1968   R. R. OTT ET AL   3,415,001

ELECTRODE ARRAY

Filed Dec. 20, 1966   2 Sheets-Sheet 1

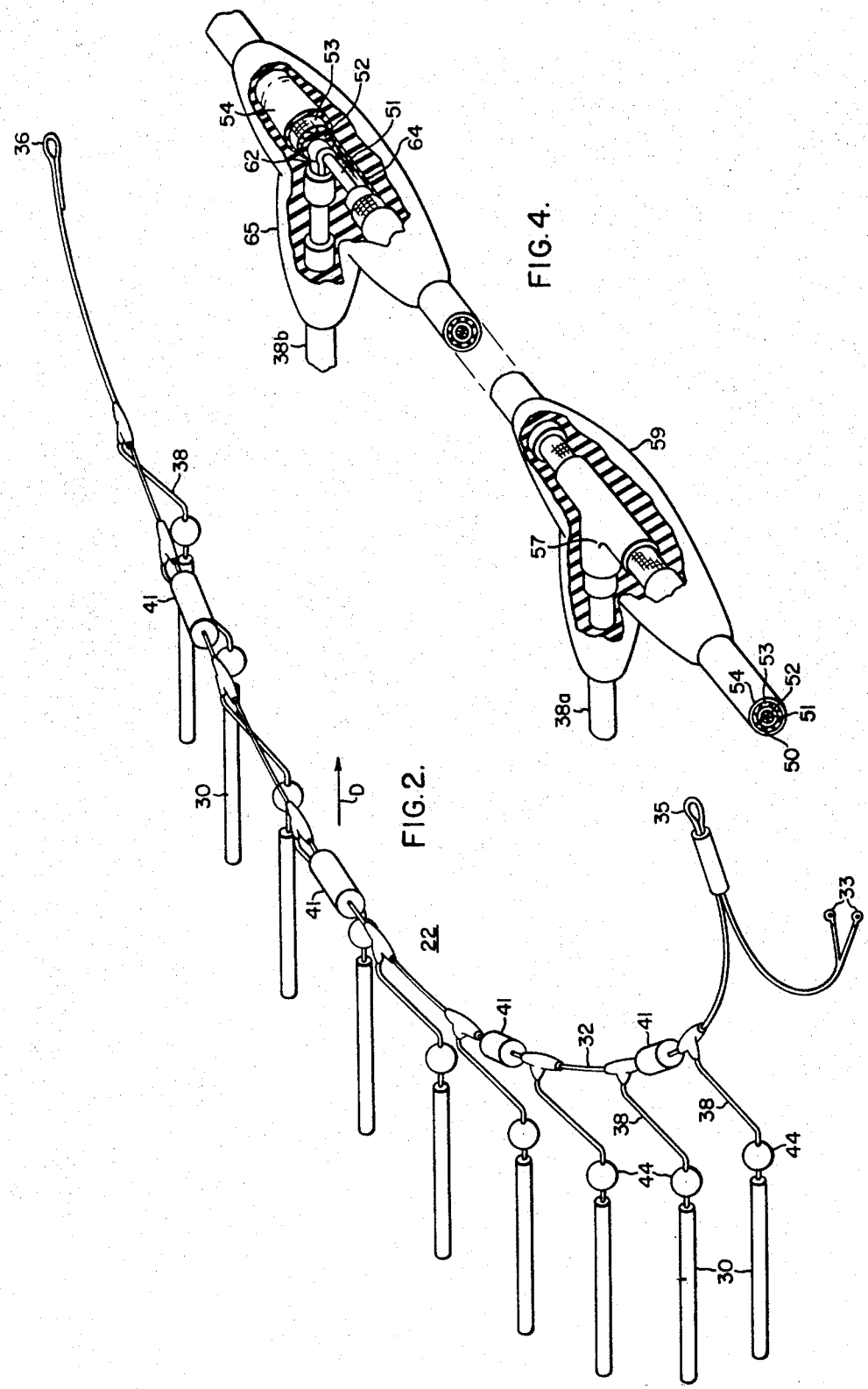

United States Patent Office 3,415,001
Patented Dec. 10, 1968

3,415,001
ELECTRODE ARRAY
Richard R. Ott and William W. Blair, Sarasota, Fla., assignors to Westinghouse Electric Corporation, Pittsburgh, Pa., a corporation of Pennsylvania
Filed Dec. 20, 1966, Ser. No. 603,252
10 Claims. (Cl. 43—17.1)

This invention in general relates to electrode arrays, and particularly to an electrode array for electrical shrimp harvesting.

Shrimping operations have included various shapes, sizes and cuts of trawl nets drawn along, or just above, the sea bottom by a surface traveling shrimp trawler. Mechanical stimulation in the form of a tickler chain dragged along the sea bottom ahead of the footrope of the trawl net has been used in order to stir up the bottom conditions and stimulate the shrimp up out of the sea bottom. This operation results in a large amount of unwanted material such as fish, shells, seaweed, sponges, rocks, etc. being kicked up and entrapped in the net which must then be hauled aboard the shrimp trawler. The total catch must then be sorted through by the trawler crew in order to pick out the useful shrimp and eliminate the unwanted material.

Electrical stimulation methods have been used to increase shrimp yields by electrically pulsing the sea bottom whereby the shrimp literally jump out of the sea bottom and into the forthcoming net. The electrode arrays for delivering the pulses however also have kicked out the unwanted material and although the shrimp yield is increased, the same time consuming and tedious operation of separating the shrimp from the trash must still be made.

It is therefore an object of the present invention to provide an electrode array for electrical shrimping operations which tends to significantly reduce unwanted trash kicked up from the sea bottom.

Another object is to provide an electrode array for electrical shrimping operations which will not snag on the sea bottom.

A further object is to provide an electrode array for electrical shrimping operations which will effectively complete the electrical circuit through the shrimp beds for increased yields.

Basically, in accordance with the above objects there is provided a plurality of preferably rigid elongated electrodes which when in operation extend in the direction of tow. An electrical feeder line means extends across the net opening for delivering electrical energy from a source to the electrodes through a plurality of electrode feeder sections, each electrically connecting a respective electrode with the lectrical feeder line means. The electrical feeder line means has a buoyancy that, when towed, the feeder line rides above the sea bottom and above the footrope of the shrimp net. The feeder sections have a length and a flexibility such that, when towed, their respective electrodes all ride on the sea bottom, with the entire length of electrode contacting the sea bottom (where bottom conditions allow) to effectively complete the electrical circuti through the shrimping beds.

The above stated as well as other objects, features and advantages of the invention will become apparent upon a reading of the following detailed specification taken in conjunction with the drawings, in which:

FIG. 2 illustrates the electrode array in more detail;
FIG. 4 illustrates, in partial section, one type of electrical connection which may be used in the array of FIG. 3.

Figure 1:
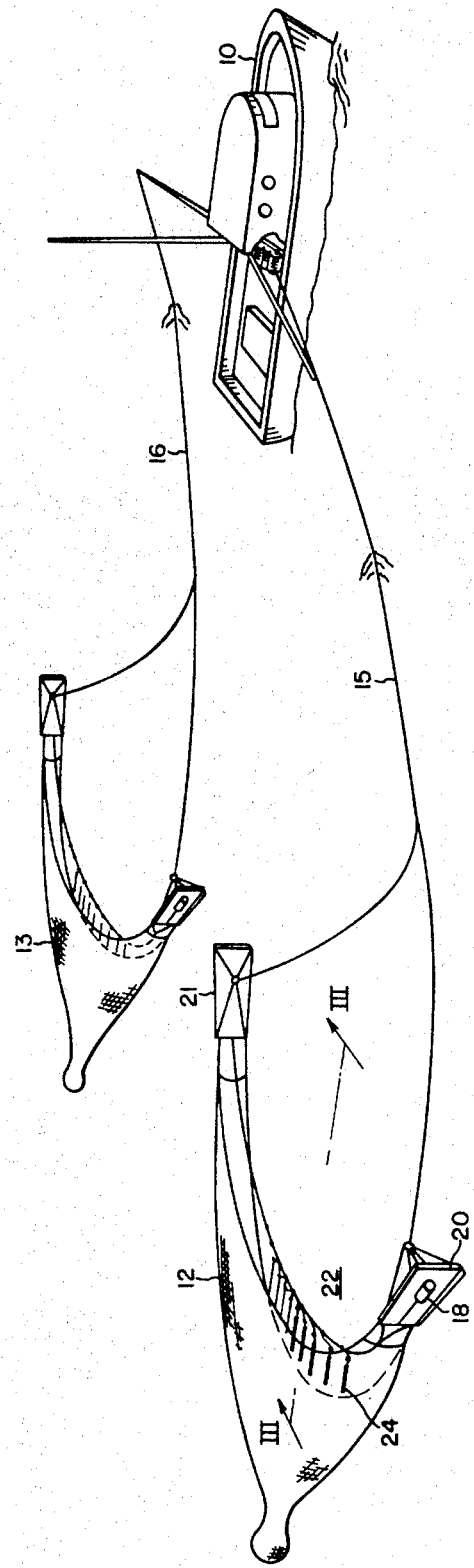
FIGURE 1 illustrates the various components and devices utilized in electrical shrimping operations and incorporating an electrode array according to the present invention.

Referring now to FIG. 1, there is shown a trawler 10 pulling a pair of shrimping nets 12 and 13 connected to the trawler by means of trawl cables 15 and 16 respectively. In one type of shrimping operation, an electrical pulser circuit 18 is mounted on one of the otter doors 20 for supplying electrical pulses to the electrode array 22 which is mechanically coupled to both otter doors 20 and 21 and precedes the footrope 24 of shrimping nets 12. A more detailed view of the electrode array 22 is provided in FIG. 2 to which reference is now made.

The electrode array 22 includes a plurality of elongated electrodes 30 each extending in the direction of tow as indicated by the arrow D. In order to supply the electrodes 30 with electrical energy, there is provided electrical feeder line means 32 which is electrically coupled to the pulser 18 (FIG. 1) by means of leads 33 and is mechanically coupled to the otter doors 20 and 21 by means of loop connections 35 and 36 respectively. In order to electrically connect the feeder line means 32 with the electrodes 30, there is provided a plurality of electrode feeder sections 38 which are of sufficient length and of such flexibility that during a towing operation the electrodes 30 ride below the general plane formed by the electrical feeder line means 32.

The electrical feeder line means 32 is constructed and arranged so as to float or ride above the sea bottom. This may be accomplished by the appropriate choice of constructional materials such as floatational plastics, foam cores, etc. so as to make the feeder line 32 positively buoyant in sea water. Alternatively and as illustrated in FIG. 2 floatation devices such as plastic or foam floats 41 may be connected with electrical feeder line means 32 at various points along the line.

The angularly depending electrode feeder sections 38 allow the entire length of the respective electrodes 30 to ride on the sea bottom. The electrodes 30 preferably are of a tubular construction and of an appropriate weight, one example being heavy copper pipe. As an aid to insuring that the electrodes maintain their bottom tending operations weights 44 may be attached to the front end of the electrode (or to the bottom end of the feeder section), and to insure a minimum of kicked up or snagged debris the weights 44 are preferably spherical. The orientation of the electrode array during a trawling operation may best be seen in FIG. 3 which illustrates a view along the lines III—III of FIG. 1.

Figure 3:
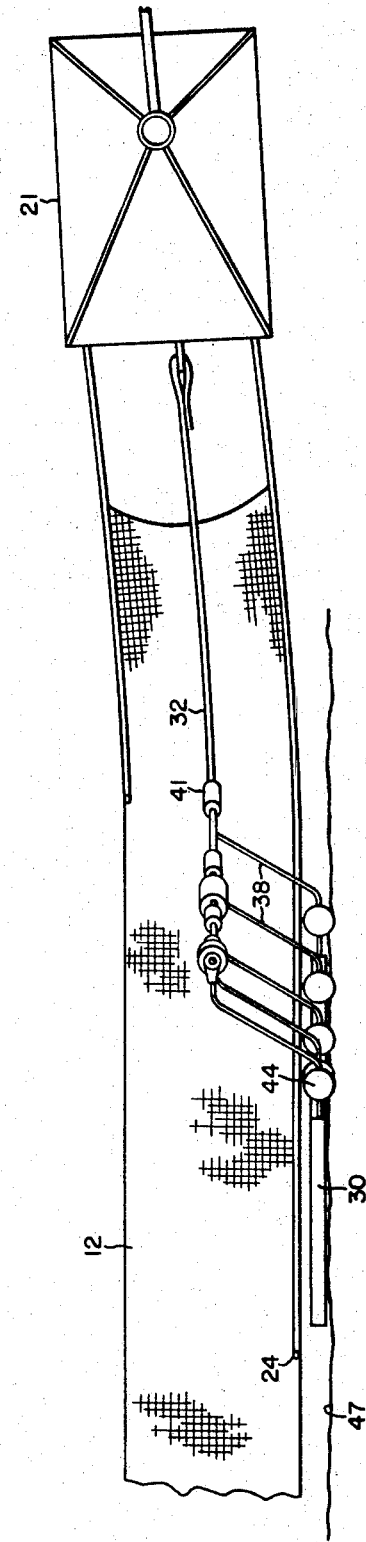
FIG. 3 illustrates a view along section III—III of FIG 1.

In FIG. 3, the electrical feeder line means 32 has a buoyancy imparted thereto such that it rides above the sea bottom 47 and above the lower part of the opening of the shrimping net 12, as represented by the footrope 24. The elongated electrodes 30 ride along the sea bottom 47 (where the terrain permits) and, in view of the electrode feeder section 38, the entire length of the electrodes 30 may be in contact with the sea bottom. In order to prevent the unwanted dissipation of electrical pulse energy before it gets to the sea bottom, it is preferable that the electrode feeder sections 38 and feeder line means 32 be insulated.

In electrical shrimping operations where a pulser supplies electrical energy to the electrodes, it is common to supply alternate electrodes with relatively alternate polarity pulses, to set up electrical fields between adjacent electrodes. Since, in the present invention the elongated electrodes provided ride on the sea bottom, a higher concentration of electrical energy is presented to the undersurface and to the shrimp beds thereby providing a more efficient operation.

It has been mentioned that given polarity pulses are supplied between adjacent electrodes of the array. This may be accomplished by an electrical feeder line means 32 made up of two adjacent cables with each cable being connected through respective electrode feeder sections 38 to alternate electrodes in the array, with one cable providing a relatively positive and the other cable a relatively negative potential. An alternative method of supplying relative positive and negative polarity pulses to the electrodes is illustrated in FIG. 4. The cable includes, as seen in cross sectional end view, an inner core 50, a first braided conductor 51, an insulation 52, a second braided conductor 53 and a cover 54. The first three components that is the inner core 50, the first braided conductor 51 and the insulation 52 may, in actuality, be a standard coaxial cable with an unused central conductor and over which the second braided conductor 53 and cover 54 may be placed. In FIG. 4 alternate electrode feeder sections have been designated 38A and 38B. For connection to electrode feeder section 38A, the cover 54 may be stripped away and an electrical connection may be made by means of an electrically conducting T-member 57, after which the joint that is formed may be encapsulated against the sea water environment by an electrically insulating potting molding material 59.

For the electrical connection to electrode feeder section 38B, the cable may be stripped away so that electrical connection may be made to the first braided conductor 51 by means of for example an electrically conducting strap member 62. In order to provide electrical continuity along the cable, the outer, or second braided conductor 53 is provided an electrically conducting bridging section 64. The joint form may then be encapsulated by means of potting material 65.

Coaxial configuration characteristics are not essential to the operation. The above is but one of many constructional techniques.

Operative electrode arrays according to the teachings herein have been constructed and tested, and to serve as an example, the component parts were comprised of the following: the electrodes were approximately one inch copper tubing 72 inches long attached to the electrical feeder line means by insulated cables constituting the respective electrode feeder sections; the electrodes were weighted by the addition of 2 or 3, split spherical, 3 oz. lead weights on the bottom end of each electrode feeder sections; and floatation of the electrical feeder line means was accomplished primarily by the addition of foam floatation balls tied at several places along the feeder line; the feeder line was, in one embodiment a coaxial cable, and in another embodiment, a parallel cable arrangement, the latter proving to be cheaper and more feasible.

Although the present invention has been described with a certain degree of particularity, it should be understood that the present disclosure has been made by way of example and that modifications and variations of the present invention are made possible in the light of the above teachings.

What is claimed is:
1. An electrode array for electrical shrimping operations wherein electrical energy is supplied to electrodes preceding a towed shrimping net, comprising:
   (a) a plurality of elongated electrodes for extending in the direction of tow;
   (b) electrical feeder line means for extending across the net opening for supplying electrical pulses to said electrodes, from an electrical source;
   (c) a plurality of electrode feeder sections, each electrically connecting a respective electrode with said electrical feeder line means;
   (d) said electrical feeder line means being of a buoyancy that, when towed, said electrical feeder line means rides above the sea bottom and above the lower part of the opening of the shrimping net;
   (e) said electrode feeder sections each being of a length and flexibility that, when towed, said electrode feeder sections depend from said electrical feeder line means in a manner that substantially the entire length of the respective electrodes may ride on the sea bottom.

2. An electrode array according to claim 1 wherein the plurality of elongated electrodes are substantially parallel to one another.

3. An electrode array according to claim 1 which includes weights located between the electrodes and electrode feeder sections.

4. An electrode array according to claim 3 wherein the weights are spherical.

5. An electrode array according to claim 1 which includes floatation buoys operably connected to the electrical feeder line means.

6. An electrode array according to claim 1 wherein the electrical feeder line means includes two independent and separate cables for alternate polarity pulses.

7. An electrode array according to claim 1 wherein the electrical feeder line means includes first and second concentric conductors.

8. An electrode array according to claim 1 wherein the elongated electrodes are tubular members.

9. An electrode array according to claim 1 wherein the connection between the electrode feeder sections and the electrical feeder line means is encased in an insulative material.

10. An electrode array according to claim 1 wherein the electrode feeder sections are electrically insulated from the surrounding water medium.

References Cited

UNITED STATES PATENTS

| | | | |
|---|---|---|---|
| 2,903,813 | 9/1959 | Gudjohnsen et al. | 43—9 |
| 3,110,978 | 11/1963 | Kreutzer | 43—4.5 |
| 3,312,011 | 4/1967 | Wathne et al. | 43—17.1 X |
| 3,369,318 | 2/1968 | Kreutzer | 43—17.1 |

WARNER H. CAMP, *Primary Examiner.*

U.S. Cl. X.R.

43—9